US008660244B2

(12) United States Patent
Blagsvedt et al.

(10) Patent No.: US 8,660,244 B2
(45) Date of Patent: Feb. 25, 2014

(54) MACHINE TRANSLATION INSTANT MESSAGING APPLICATIONS

(75) Inventors: Sean Blagsvedt, Bangalore (IN); Ganesh Ananthanarayanan, Tamil Nadu (IN); Kentaro Toyama, Bangalore (IN); Edward Cutrell, Seattle, WA (US); Swagath Kannan, Chennai (IN)

(73) Assignee: Microsoft Corporation, Redmond, WA (US)

( * ) Notice: Subject to any disclaimer, the term of this patent is extended or adjusted under 35 U.S.C. 154(b) by 1435 days.

(21) Appl. No.: 11/357,447

(22) Filed: Feb. 17, 2006

(65) Prior Publication Data

US 2007/0208813 A1  Sep. 6, 2007

(51) Int. Cl.
*H04M 1/64* (2006.01)
*G06F 17/28* (2006.01)

(52) U.S. Cl.
USPC .......................................... 379/88.25; 704/2

(58) Field of Classification Search
USPC ............. 379/67.1–88.28, 289; 704/1–10, 277
See application file for complete search history.

(56) References Cited

U.S. PATENT DOCUMENTS

| | | | | |
|---|---|---|---|---|
| 5,966,685 | A * | 10/1999 | Flanagan et al. | 704/8 |
| 5,987,401 | A * | 11/1999 | Trudeau | 704/2 |
| 6,424,983 | B1 * | 7/2002 | Schabes et al. | 715/257 |
| 7,272,406 | B2 * | 9/2007 | Chava et al. | 455/466 |
| 7,343,556 | B2 * | 3/2008 | Dahl | 715/264 |
| 2002/0169592 | A1 * | 11/2002 | Aityan | 704/2 |
| 2002/0194300 | A1 * | 12/2002 | Lin et al. | 709/217 |
| 2003/0125927 | A1 * | 7/2003 | Seme | 704/3 |
| 2003/0149557 | A1 * | 8/2003 | Cox et al. | 704/2 |
| 2003/0220972 | A1 * | 11/2003 | Montet et al. | 709/204 |
| 2004/0102201 | A1 | 5/2004 | Levin | |

(Continued)

FOREIGN PATENT DOCUMENTS

| | | |
|---|---|---|
| CN | 1399208 A | 2/2003 |
| JP | 2001-236347 | 8/2001 |

(Continued)

OTHER PUBLICATIONS

Van der Burg, Hans, "Apply Real-time Collaboration with Sametime," from website: http://mobilebusinessadvisor.com/doc/07484, Lotus Advisor, 10 pages (Feb. 2001).

(Continued)

*Primary Examiner* — Simon Sing
*Assistant Examiner* — Solomon Bezuayehu
(74) *Attorney, Agent, or Firm* — Steve Wight; Carole Boelitz; Micky Minhas

(57) ABSTRACT

An instant messaging translation plug-in interacts with an instant messaging program to intercept incoming messages and forward these messages to a language translation service. The plug-in then displays a translation received from the service along with the original message. This provides translation which can be used by instant messaging users to communicate across language barriers, and without local translation or knowledge of the internal workings of the translation services used. Additionally, the translation plug-in also provides for manual translation of messages, which allows communication with users who use a different language but do not use the translation plug-in. Messages are modified before translation in order to correct spelling, to prevent particular words or phrases from being translated, and to change instant messaging language into standard language form. The techniques can be performed on various messaging services, including instant messaging on computers or mobile devices, as well as SMS.

17 Claims, 11 Drawing Sheets

(56) References Cited

U.S. PATENT DOCUMENTS

| | | |
|---|---|---|
| 2004/0102956 A1 | 5/2004 | Levin |
| 2004/0158471 A1 | 8/2004 | Davis et al. |
| 2005/0210396 A1* | 9/2005 | Galli .............................. 715/758 |
| 2005/0216252 A1* | 9/2005 | Schoenbach et al. ............. 704/3 |
| 2005/0267738 A1* | 12/2005 | Wilkinson et al. ................ 704/9 |
| 2006/0080083 A1* | 4/2006 | Lin et al. ............................ 704/8 |
| 2007/0041370 A1* | 2/2007 | Cleveland ..................... 370/352 |
| 2007/0294078 A1* | 12/2007 | Kim et al. .......................... 704/2 |
| 2011/0078270 A1* | 3/2011 | Galli et al. .................... 709/206 |

FOREIGN PATENT DOCUMENTS

| | | |
|---|---|---|
| JP | 2001-306563 | 11/2001 |
| JP | 2003-058454 | 2/2003 |
| JP | 2003-529845 | 10/2003 |
| KR | 2002-0043937 A | 6/2002 |
| KR | 2004-0017952 A | 3/2004 |

OTHER PUBLICATIONS

International Search Report and Written Opinion for PCT/US07/004045, dated Jul. 26, 2007.

Translation of Notice of Rejection mailed on Nov. 11, 2011, in the related Japanese Application No. 2008-555356, 4 pages.

English Translation of Notice of Rejection mailed on Aug. 17, 2012, in the related Japanese Application No. 2008-555356, 3 pages.

* cited by examiner

Software 1180 Implementing Instant
Messaging Translation Techniques

US 8,660,244 B2

MACHINE TRANSLATION INSTANT MESSAGING APPLICATIONS

BACKGROUND

Instant messaging has become a widely used tool for communicating in real-time over the Internet. Millions of Internet users are using instant messaging applications to chat with fiends and family, communicate in chat rooms, and even to exchange pictures or documents. Moreover, several organizations and businesses are integrating instant messaging applications into their repertoire of standard network tools to enhance business communication and replace costly telecommunication services (e.g., telephone and video conferencing). As the Internet's popularity continues to increase around the world, international communication is increasingly common. This means, however that users will encounter language barriers when using instant messaging.

There are several techniques currently available for addressing such language barriers. In one, a user of an instant messaging tool types a message in their own, or preferred, language into a separate translation program or web site. The user must then activate the translation tool to translate the message into the destination language, and cut and paste the translated text back into the text field of the instant messaging tool. Once this is complete, the user can transmit the message. While this method can be effective, it is obvious that the process of continually cutting, pasting and switching between applications significantly impedes the communication process. Locating good translation tools can also be difficult and distracting for users. And because any one translation tool may not support all language needs a particular user could have, a user may find himself or herself utilizing numerous different tools to chat with different contacts around the world, which also lessens the utility of the messaging service.

In other techniques, a dedicated translation tool is integrated with an instant messaging program. These techniques are lacking in flexibility, however, because they tie the messaging program to a single translation tool and do not take advantage of existing translation tools available, many online, some of which are updated frequently and are of a superior quality. In other techniques, a sort of translation "middle man" is used to translate messages as they are sent from one user to another. While these techniques require little additional work on the part of the user, some users may find that they require too much delegation of control to the translator, preventing users from controlling how their messages are translated and from refining the translated messages. A final problem with existing automated translation techniques is that many require each user to utilize the same translation technology in order that both can communicate across a language divide.

SUMMARY

Techniques and tools for translation in messaging applications is described. In particular, a plug-in to an instant messaging application forwards messages to third-party translation services before displaying the messages to a user. This allows the user to communicate with contacts that do not necessarily speak or write the user's language. Additionally, user interface features are described which allow greater flexibility of language use with the translation services, as well as the ability to correct translations and customize how translations are performed.

Thus, in one example, a method of translating text in instant messaging is described which comprises, under control of an instant messaging program, intercepting an incoming message, sending the message to a translation service, and displaying a translation of the message.

In another example, a system for displaying translations of instant messaging text is described. The exemplary system comprises a translation module and an instant messaging module configured to receive a message. The translation module is configured to receive an indication that the message is to be translated, allow the message to be automatically modified according to user preferences to facilitate translation, and translate the message. The instant messaging module is configured to display the translated message.

In another example one or more computer-readable media are described which contain machine-executable instructions which describe a method for facilitating messaging between two users communicating in different languages. The method comprises receiving an indication from a user of a first language used by the user and a second language used by a person with whom the user is communicating, receiving an indication that a message has been received by a messaging service, performing modifications to the message to prepare the message for translation, sending the message to a translator which is configured to translate text from the second language to the first message, receiving a translation of the message from the translator, and displaying the translation to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

DETAILED DESCRIPTION

The following description relates to the translation of instant messaging messages by a translation plug-in to an instant messaging program which communicates with external translation services to perform translation work. By utilizing a lightweight plug-in, a user is offered a strong degree of flexibility over translation while the actual translation is offloaded to separate services in order to reduce computation loads on the user's computer. Additionally, by using third-party translation services, the translation plug-in lets users select from many different services, allowing users to select the service that works well for them.

In particular, the translation plug-in works by intercepting messages received by an instant messaging program, and then sending those messages to a pre-selected translation service. Once a reply with a translation of the message is received from the service, the translation plug-in then displays the translation. In this way, messages can be translated using the translation serviced without requiring knowledge of the service's processes by the translation plug-in. Additionally, the translation plug-in offers a translation box which allows a user to input data to be immediately sent to a translation service, translated, and then sent to the user's contact. While translations are not guaranteed to be perfect, the additional contextual information provided through the translations should be enough to facilitate a user in communicating across a language divide, even with a person who does not have access to the translation plug-in. While some of the instant messaging features described herein are described with reference to particular instant messaging applications, the techniques and features described here can be used in various alternative messaging applications and situations, including, but not limited to instant messaging devices running on mobile phones (or other mobile devices) and SMS messaging.

1. Network Interaction

Figure 1:
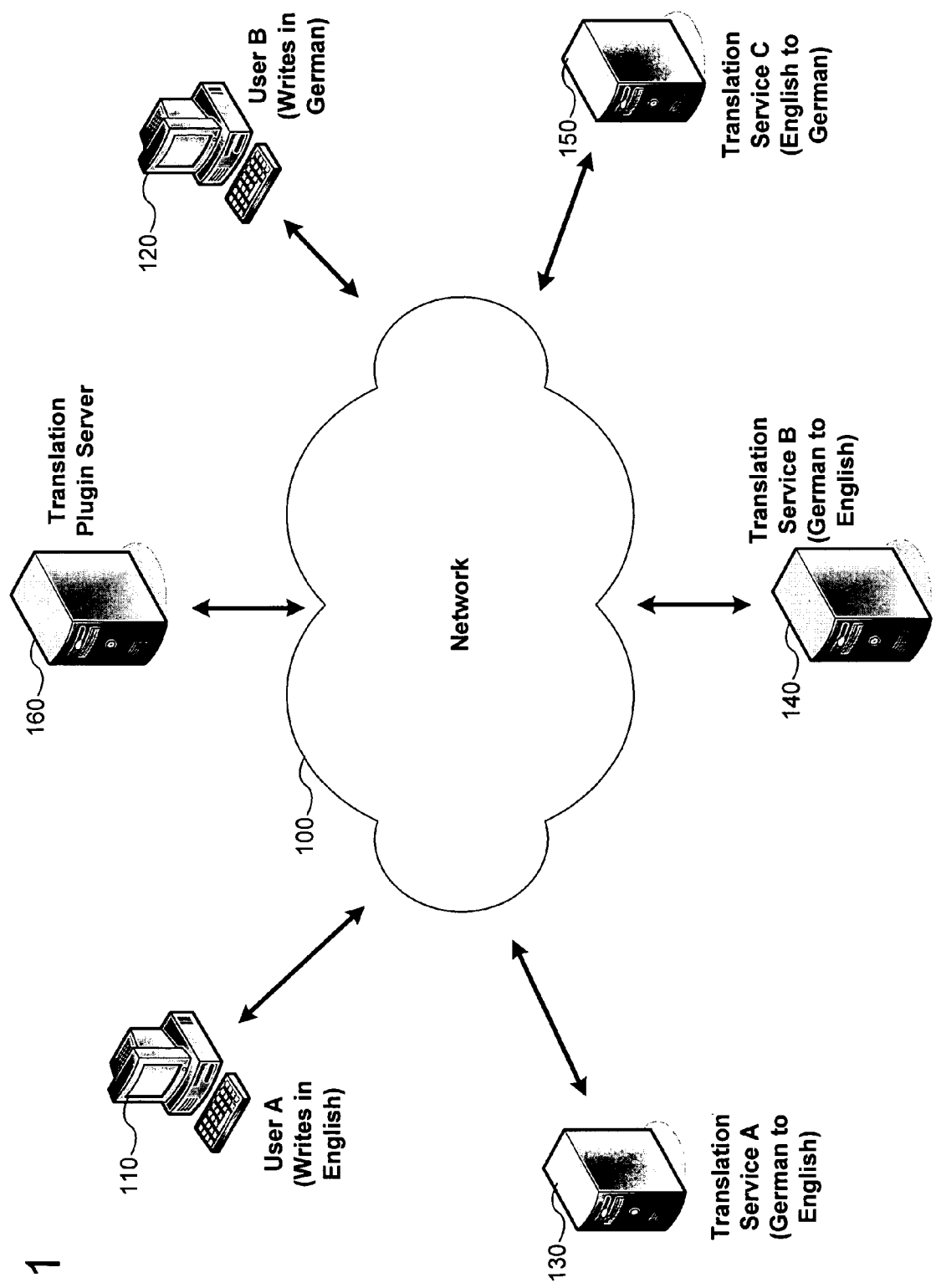
FIG. 1 is a diagram of exemplary interactions between instant messaging computers and translation tools over a network.

FIG. 1 is a diagram illustrating components of the instant messaging translation techniques described herein as they communicate via a network 100. In one implementation, the network 100 comprises the Internet, such that users in different countries will use the techniques described herein to communicate. In alternative implementations, the network 100 can comprise other networking implementations, such as, for example, intranets, local area networks, wide area networks and Ethernet, as well as networks comprising, in whole or in part, wireless networking protocols (e.g., 802.11a, 802.11b, 802.11g, etc.).

FIG. 1 also illustrates two computers 110 and 120, each of which is used by a user to communicate via an instant messaging program. In the example illustrated in FIG. 1, computer 110 is used by a User A who communicates in English, while computer 120 is used by a User B who communicates in German. FIG. 1 also illustrates various translation services 130, 140 and 150, which are connected to the network 100 and which can translate text from one language to another. As illustrated in FIG. 1, the translation services 130, 140, and 150 each provide translation in one direction (e.g., from German to English).

In some alternative implementations, one or more translation services will provide translation in both directions (e.g. from English to German as well as German to English). In one implementation, the translation services allow communication through a standard web services protocol; in alternative implementations, a dedicated translation protocol, is used. In one implementation, by using known communications methods to request and receive a translation, the translation plug-in is able to send text to and receive translations from translation services without knowing anything about the internal operation of the services. In another implementation, one or more translation services are located on the computers running the instant messaging programs (for instance, as dynamically-linked libraries or as compiled programs) and the translation plug-in does not require use of the network to communicate with the services. However, in these implementations, the services may still be opaque to the plug-in and thus relied upon without reference to their internal workings.

FIG. 1 also illustrates a translation plug-in server 160, which, in one implementation, contains code for the translation plug-in and provides the code in response to a request from an instant messaging program. The translation plug-in server may also provide network addresses or locations for the various translation services; in one implementation, this is done by the translation plug-in server 160 maintaining a list of known translation services, as well as their network addresses.

Figure 2:
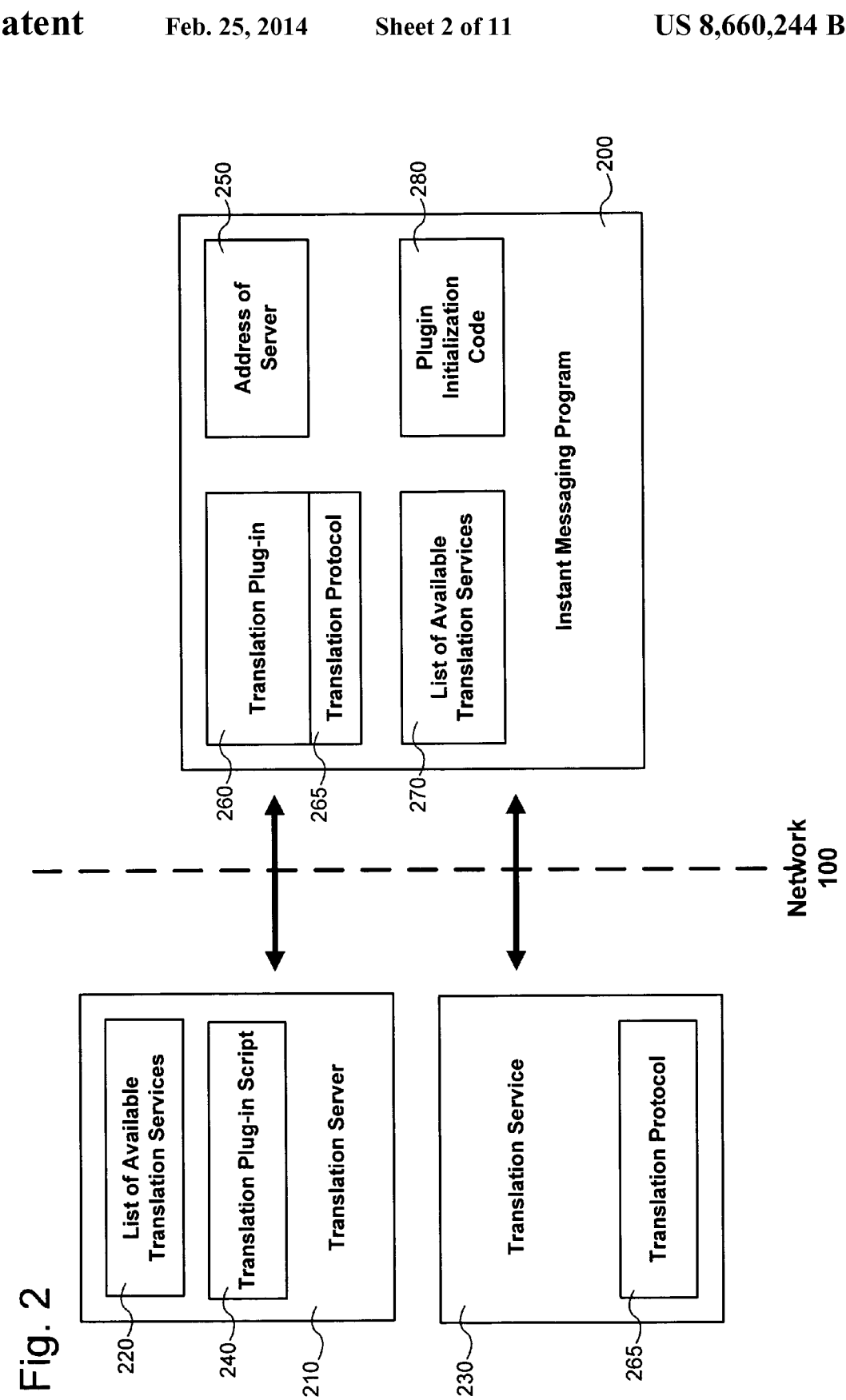
FIG. 2 is a block diagram illustrating exemplary components of and interactions between an example instant messaging program with translation plug-in and an example translation server and an example translation service.

FIG. 2 is a block diagram illustrating components of an example instant messaging program 200, an example translation server 210 and an example translation service 230 which interact over the network 100 according to the techniques described herein to provide instant messaging translation. In various implementations, the instant messaging program 200 can be implemented as one of various known proprietary or open source instant messaging platforms, including, but not limited to, Windows Messenger, MSN Messenger, AOL Instant Messenger, Yahoo Messenger, Google Talk, ICQ, and implementations using the Jabber protocol. In a preferred implementation, the instant messaging program 200 supports the use of plug-ins or other modular programs which extend the functionality of the instant messaging program. In alternative implementations, various translation techniques described herein are implemented as an integrated part of the instant messaging program.

FIG. 2 illustrates one example of a translation plug-in 260 implementing the translation techniques described herein. The translation plug-in may be implemented in a variety of ways. In one implementation, the plug-in is implemented using a scripting language such as, for example, JavaScript. In alternative implementations, the translation plug-in may be implemented using a compiled or interpreted language.

In the illustrated implementation, the translation plug-in 260 is downloaded over the network 100 from the translation server 210, which maintains a translation plug-in script 240 and which provides the script to instant messaging programs upon requests. In the illustrated implementation, the instant messaging program is able to communicate with the translation server 210 because it maintains an address 250 for the server which it uses when sending requests for the script over the network 100. As described above, in some implementations the translation plug-in 260 may not be implemented as a plug-in, but rather as an integrated portion of the instant messaging program 200, in which case, it is not necessary to maintain a script for the plug-in 260 on a server.

As FIG. 2 also illustrates, the translation server maintains a list 220 of available translation services for downloading over the network 100 by the instant messaging program 200 or translation plug-in 260. In one implementation, this list comprises network addresses for the translation services, as well as an indication of the languages which are translated by the listed services. One reason for providing this list on a translation server is so that a centralized list of services can be kept and updated, rather than requiring that users of the translation plug-in locate the translation services they wish to use. In an alternative implementation, the list is not maintained on a central server, but instead users input the services they wish to use with the translation plug-in. In yet another implementation, the centralized list is maintained, but users are also able to input non-listed services to use with the translation plug-in, or to suggest services for inclusion in the list 220.

As FIG. 2 illustrates, information from the list 220, once downloaded from the translation server 210, is maintained in the instant messaging program as a list 270 of available translation services. In various implementations, the list 270 may represent all or part of the information in the list 220, as well as additional translation service information input by a user. The instant messaging program also comprises plug-in initialization code 280 which provides functionality for downloading of the translation plug-in script 240 and the list 220 of available translation services from the translation server 210.

As FIG. 2 illustrates, the translation plug-in 260 also has associated with it a translation protocol 265, which facilitates communication over the network 100 between the translation plug-in 260 and various translation services, such as translation service 230. To facilitate this communication, the example translation service 230 also implements the translation protocol 265 so allow translation requests and results to be transmitted over the network 100. In alternative implementations, communication between translation services and the instant messaging program does not require a dedicated translation protocol, and instead makes use of other mutually-understood communications protocols.

It may be noted that no other internal components of the translation service are illustrated. This represents the flexibility of the translation techniques described herein, as they are not bound to any particular translation service implementation. As long as the translation plug-in can communicate with the translation service, translations can be obtained, regardless of the internal mechanisms of the translation service 230.

2. Examples of the Translation Plug-in in Operation

Figure 3:
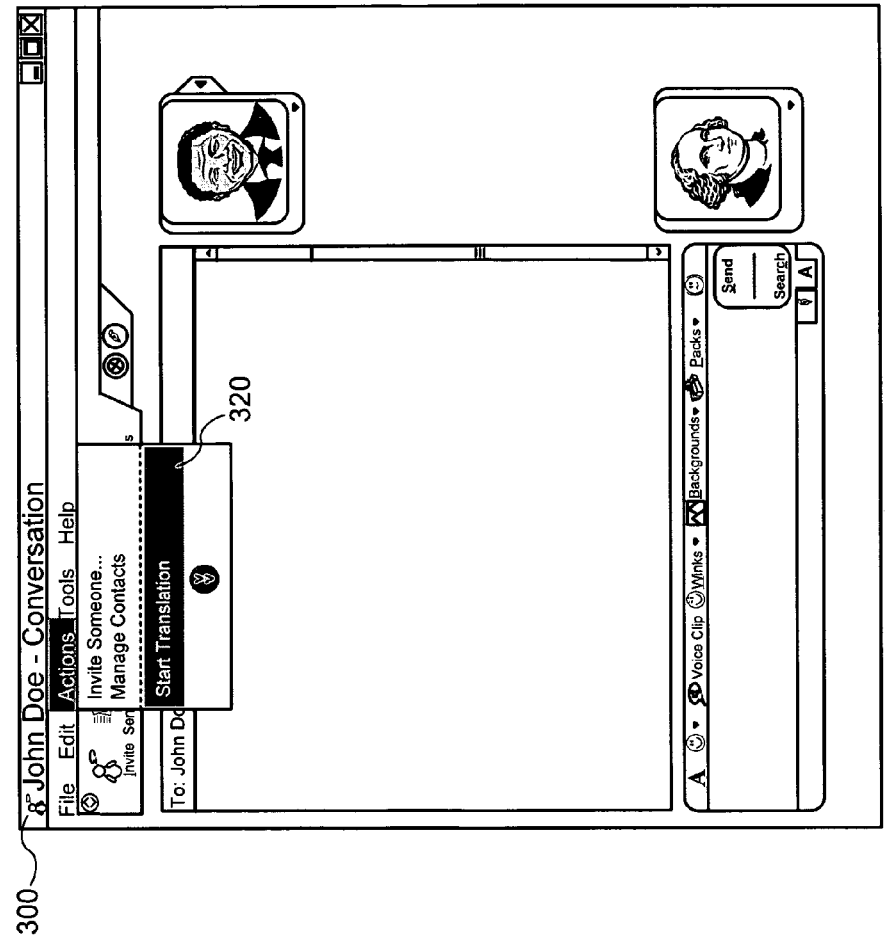
FIG. 3 is a diagram of an exemplary instant messaging window before activation of the translation plug-in of FIG. 2.

FIG. 3 shows a diagram of a window 300 of an instant messaging program 200 being used to start up translation of instant messages using a translation plug-in. In the illustrated implementation, the instant messaging program (which has previously been started by a user) has been configured to display a menu item 320, selection of which by a user starts translation. In another implementation, the translation techniques are started when the instant messaging program beings, and there is no requirement to separately start translation, and thus no requirement to have the menu selection 320.

Figure 4:
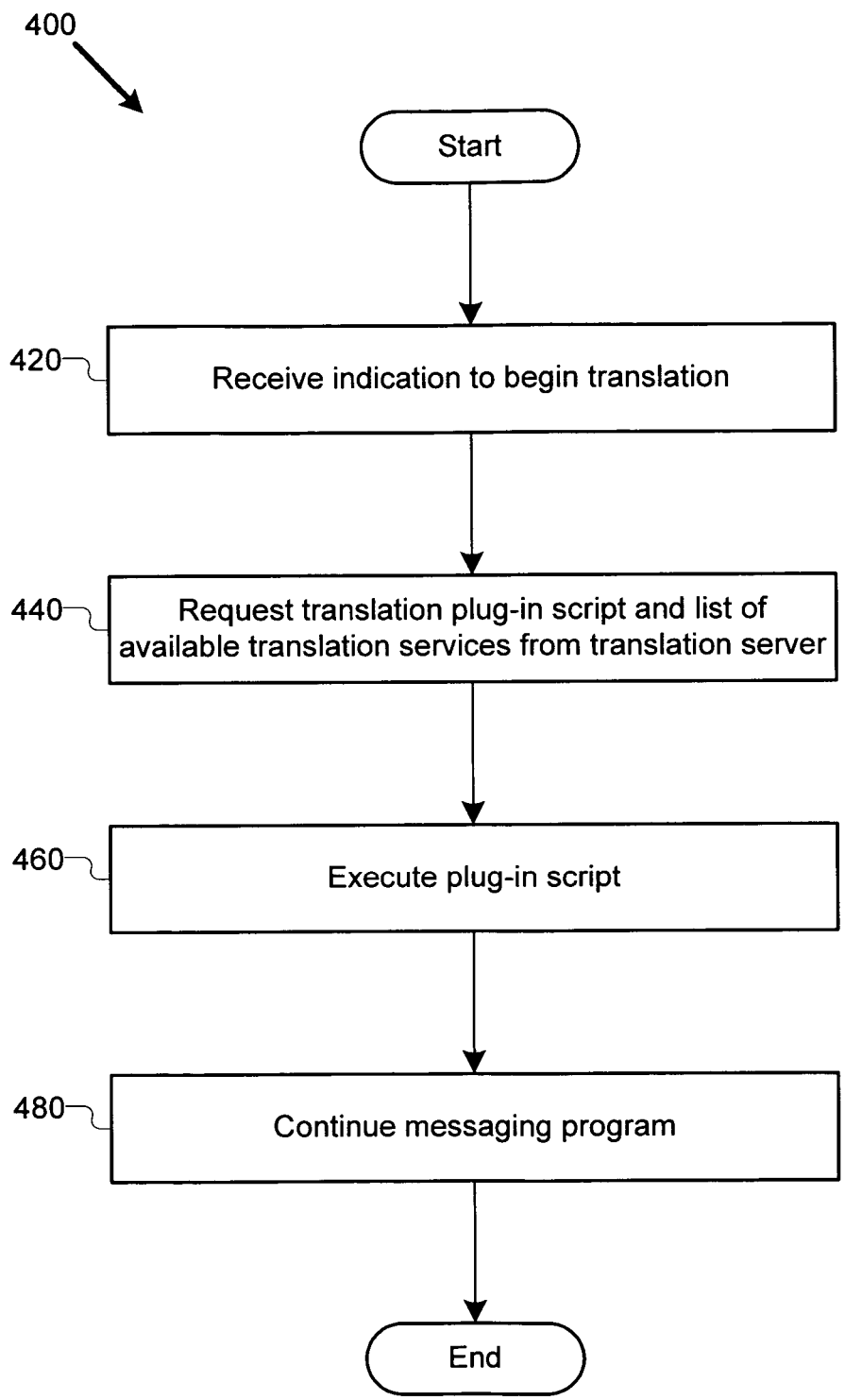
FIG. 4 is a flowchart illustrating an exemplary process of the instant messaging program for activating the translation plug-in of FIG. 2.

FIG. 4 illustrates an example process 400 performed by the instant messaging program 200 for starting and initializing a translation plug-in 260. In various implementations of process 400, the illustrated process blocks may be broken up, merged or omitted. In one implementation, process 400 is performed by the instant messaging program 200 executing the translation plug-in initialization code 280. The process begins at block 420, where the instant messaging program receives an indication from a user to begin translation of instant messages. As illustrated in FIG. 3, this indication can take the form of a menu selection; other implementations of process 400 may use different indications or may begin translation automatically when the instant messaging program is started, omitting block 420.

Next at block 440, the instant messaging program requests the plug-in script and list of available translation services from the translation server. At block 460, the instant messaging program executes the plug-in script (or causes the script to be executed on the computer which the program is running on), which instantiates the translation plug-in and allows translation to occur. Finally, at block 480, the messaging program continues to execute at block 480, leaving the now-running translation plug-in to perform translation duties.

Figure 5:
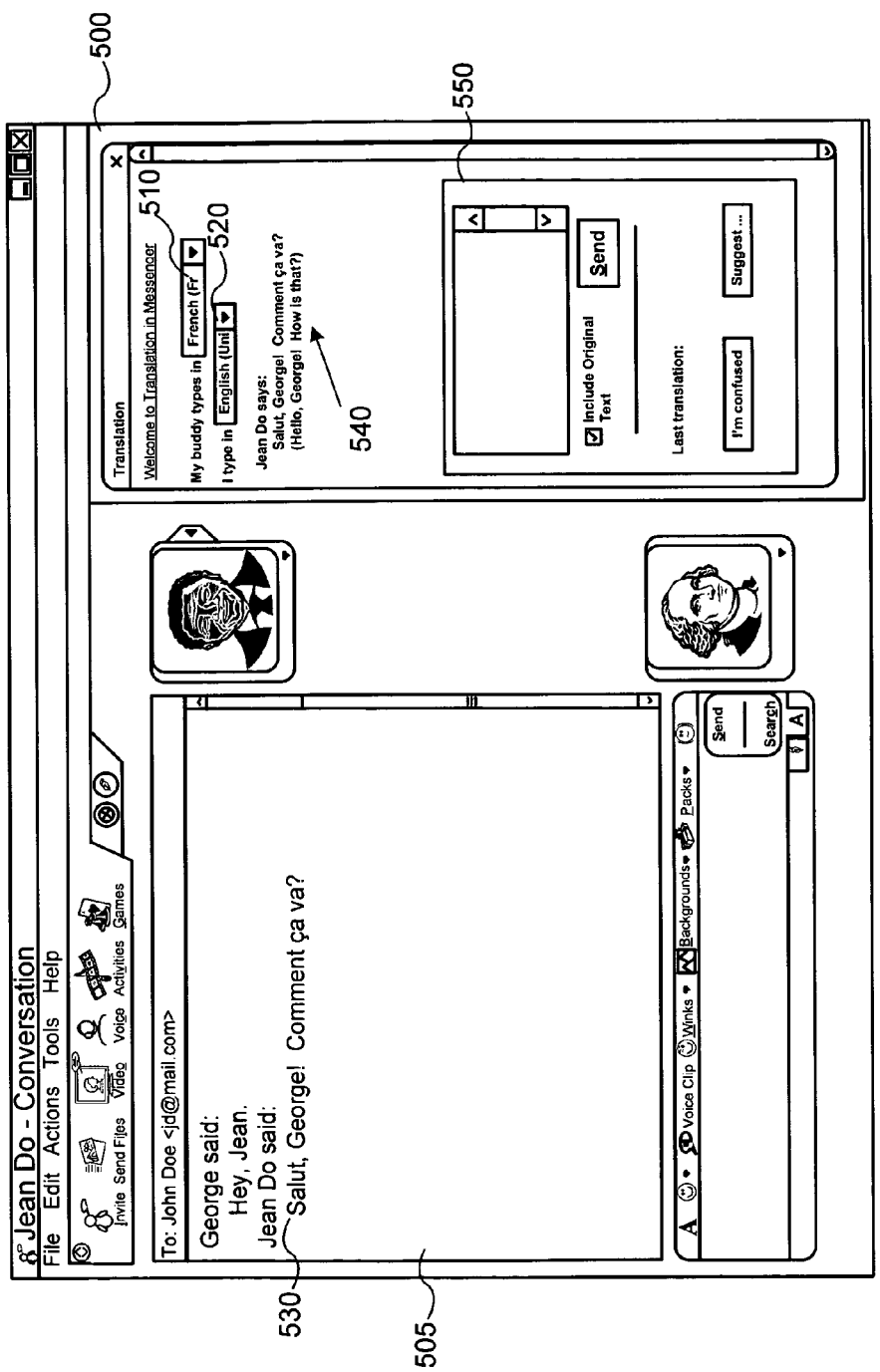
FIG. 5 is a diagram of an exemplary instant messaging window using the translation plug-in of FIG. 2.

FIG. 5 shows a diagram of an instant messaging program 200 while a translation plug-in 260 is running and displaying a translation pane 500. As FIG. 5 illustrates, the translation pane 500 is a front-end to the translation plug-in which provides an interface to see the display of translations as they are made and to interact with the translation plug-in. For example, FIG. 5 shows drop-down menus 510 and 520 which provide a user with a selection of languages for which translation can be performed. Thus, the user of the translation plug-in in FIG. 5 knows that his or her contact will be communicating in French, and so he or she selects the option from drop-down menu 510 to indicate that the contact will be typing in French. Similarly, the user can select a language from drop-down menu 520 to indicate the language he or she communicates in, which in this example is English. As will be described, in one implementation, the drop-down menus are populated by information from the list of available translation services downloaded from the translation server. Additionally, in some implementations, the drop-down menus may be interactive, with one menu changing its entries depending on the choice selected in the other menu based on which translation services are available. Thus, for example, if French is selected in the first menu 510, then menu 520 would only contain languages for which there are translation services available to translate into from French. In another implementation, if there exists more than one available translation service which translates between a certain pair of languages, the drop-down menus may indicate, in addition to the selectable languages, which translation services are being selected, in order that a user may select his or her preferred translation service.

FIG. 5 also shows an example of the translation plug-in being used to perform translations. FIG. 5 illustrates an example of a conversation taking place in the messaging window 505 between a local user "George" and his remote contact "Jean Do." In this example, Jean has replied to George's initial greeting with the French-language message "Salut, George! Comment ça va?" (530). Because George does not understand French, and because he knows that Jean will be typing in French, he has previously selected that messages should be translated from French to English in the drown-down menus 510 and 520. Thus, the message 530 from Jean has been repeated in the translation pane along with a translation "Hello, George! How is that?" (540). Thus George can use the translation 540 to better understand the response from Jean. While it is appreciated that the translation displayed in the translation pane may not be perfect (depending on the capabilities of the translation service used) the translation should serve to provide enough information that the user (here, George) can make out the general meaning of the message received from his or her contact. The translation pane 500 also includes a translation box 550 which can be used for manually-requested translations, according to examples which will be described with reference to subsequent figures.

Figure 6:
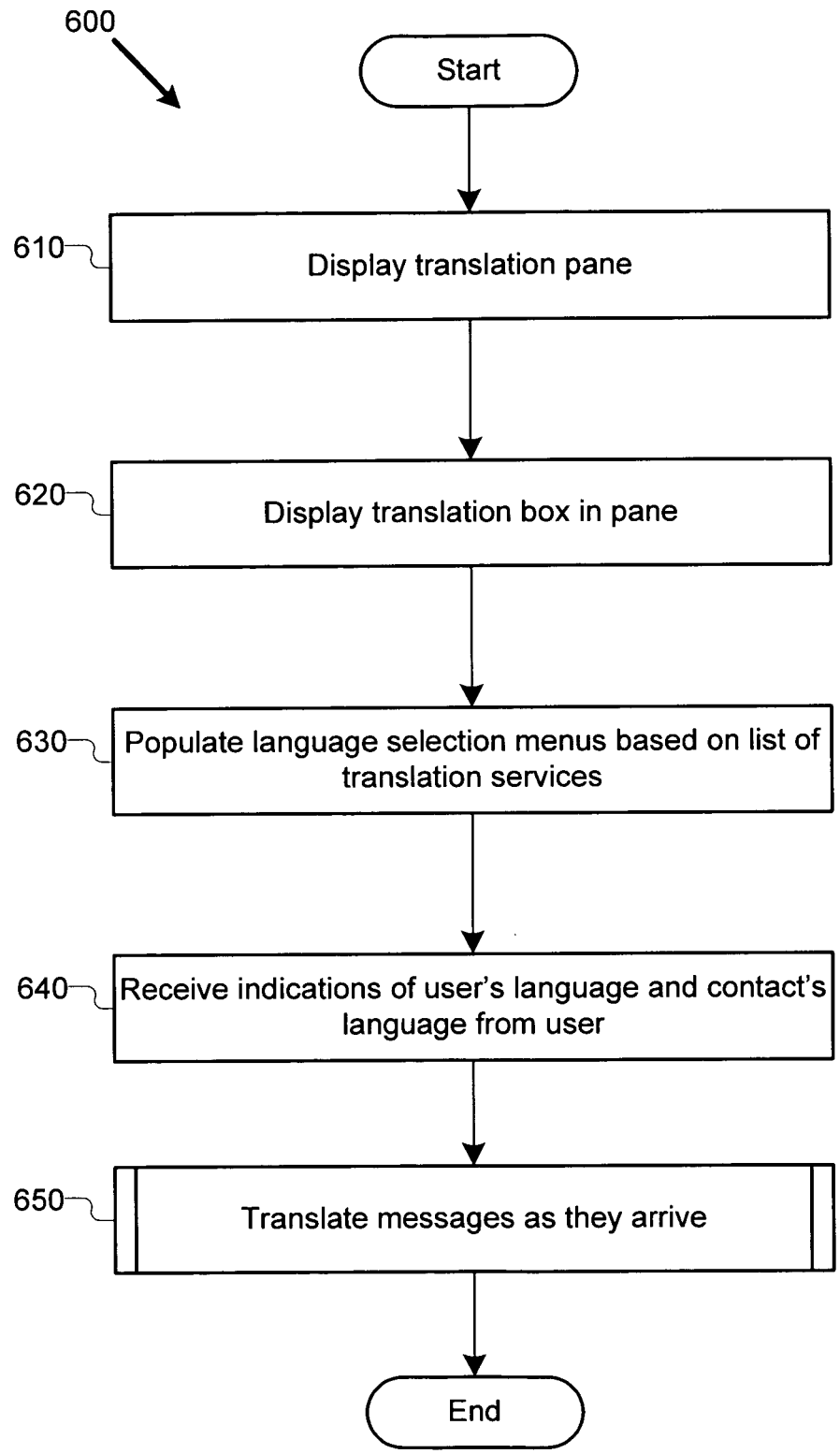
FIG. 6 is a flowchart illustrating an exemplary process of the translation plug-in for preparing to translate messages.

FIG. 6 illustrates an example process 600 performed by the translation plug-in 260 for preparing to translate instant messages. In various implementations of process 600 the illustrated process blocks may be broken up, merged or omitted. The process begins at block 610, where the translation plug-in 260 displays the translation pane 500. Next, at block 620 the translation box 550 is displayed within the pane. In another implementation of the process 600, the translation box is not immediately displayed when the translation pane 500 is displayed, but instead is hidden until an indication is received from a user to display the box.

Next at block 630 the translation plug-in populates the language selection menus 510 and 520 based on the list of available translation services downloaded in process 400. In another implementation, the process of block 630 also populates the list with translation services which are indicated by the user. At block 640, the process receives indications from the user about the user's language and his or her contact's language. Finally, at block 650, the translation plug-in translates messages as they arrive to the instant message program 200. The process of block 650 is described in greater detail with reference to FIG. 7.

Figure 7:
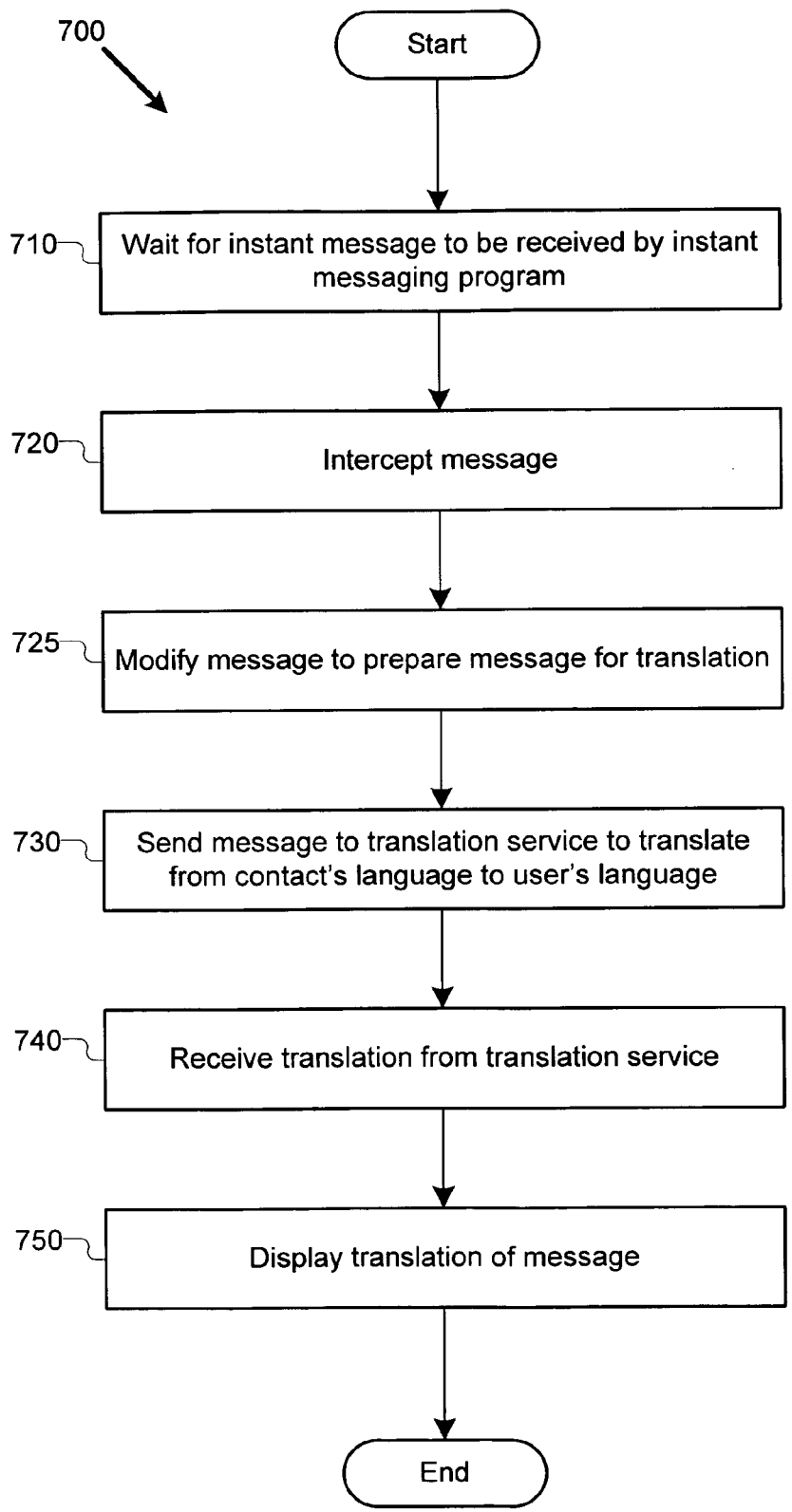
FIG. 7 is a flowchart illustrating an exemplary process of the translation plug-in for translating messages that are received by the instant messaging program of FIG. 2.

FIG. 7 illustrates an example process 700 performed by the translation plug-in 260 for translating instant messages. In various implementations of process 700, the illustrated process blocks may be broken up, merged or omitted. In one implementation, the process of block 650 comprises process 700. The process begins at block 710, where the translation plug-in 260 waits for instant messages to be received by the instant messaging program 200. Next, at block 720, the translation plug-in 260 intercepts an incoming message. In one implementation, this intercept is done through an event handler that alerts the instant message program when a new message has been received. In another implementation, the translation plug-in may periodically poll the instant messaging program to determine if a new message has been received. Following block 720, at block 725 the translation plug-in performs modifications to the message to prepare it for translation by a translation service. Examples of such modification include, but are not limited to, automatic correction of spelling errors and correction of instant messaging language structures into standard language.

Next, at block 730, the translation plug-in 260 sends the message to an appropriate translation service to be translated from the contact's language to the user's language. In one implementation the translation service to which the message is sent will be one chosen by the choices of languages from drop-down menus 510 and 520. Additionally, as mentioned above, in various implementations, the message sent at block 530 may be in a known translation message protocol, or may alternatively be sent in other protocols mutually-known to the translation service and the translation plug-in.

Next, at block 740, the translation for the message is received from the translation service, and, at block 750, the translation is displayed. In various implementations, the translation may be displayed with or without the original foreign-language text; the choice to display the original message or not may be left to the user as an option.

3. Examples of Instant Messaging Translation Features

Figure 8:
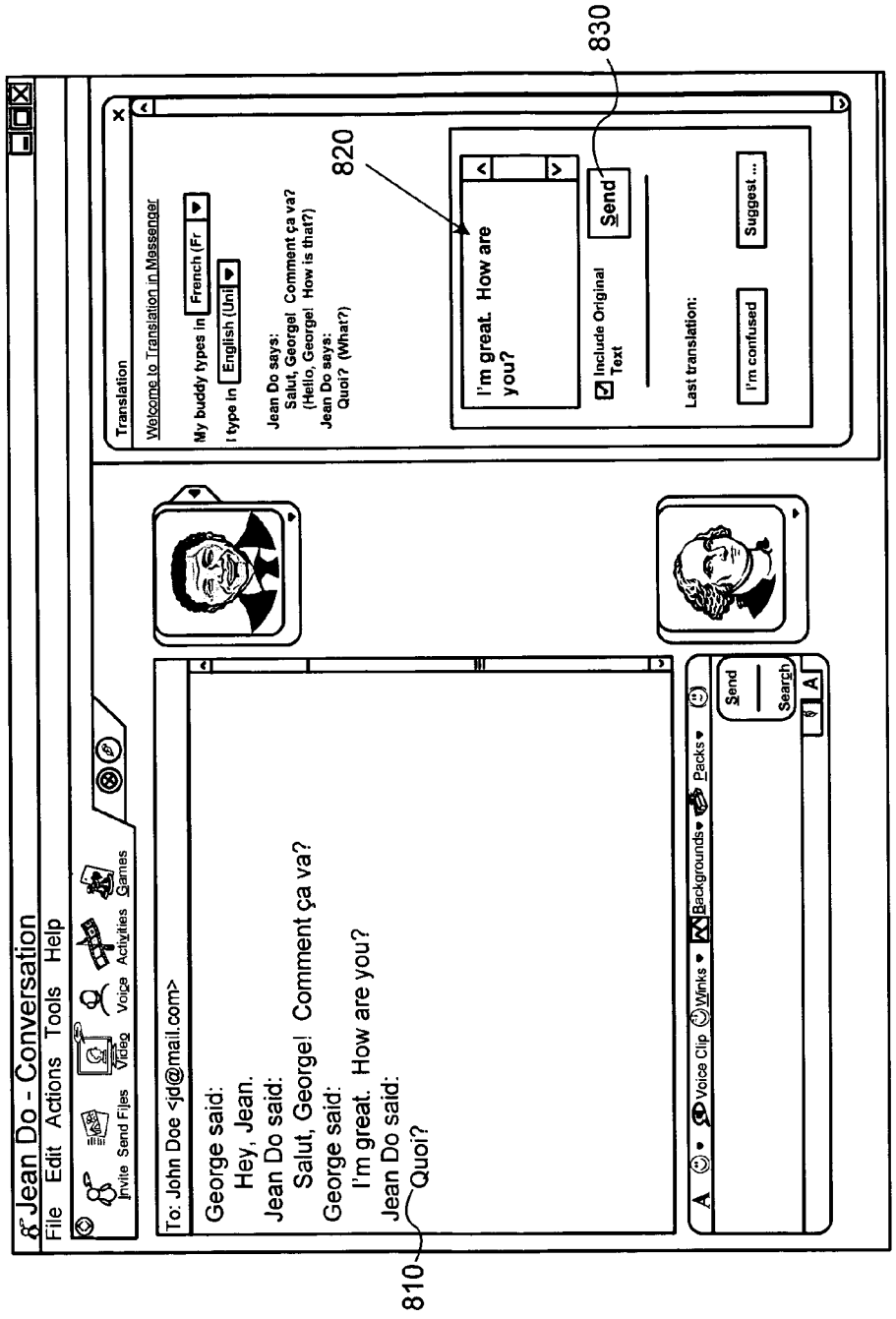
FIG. 8 is a diagram of an exemplary instant messaging window using a translation box in the translation plug-in of FIG. 2.

While various tools and features herein are described in the context of the translation plug-in, it will be recognized that, in various implementations, features can also be used in other instant messaging translation implementations. Various of these features may be used in either the machine translation implementations described above, or on other messaging applications with translation, including, but not limited to instant messaging programs running on mobile phones or other mobile devices and SMS messaging using translation. FIG. 8 shows a diagram of an example use of the translation box 550. In the example of FIG. 8, the conversation originally started in FIG. 5 has continued. The user, George, has replied to the message sent by the contact, Jean, with the reply "I'm great. How are you?" Jean, however does not understand this reply, possibly because he does not have translation capabilities on his end, and has replied with a message "Quoi?" (810) asking what the earlier message means. At this point in the example, George decides that it would be best to send a French translation of his earlier sentence to see if Jean will understand the translation.

George can do this by using the translation box 550 to create and send a manual translation of the message. To do so, George types the message into the text box 820 of translation box 550 and then hits the "Send" button 830. The text is then sent to be translated by a translation service and then the translation is sent to the contact. Note that because each translation service is not assumed to provide bi-directional translations, and because the manual translation needed in the example of FIG. 8 is in a different direction (e.g. English to French) than the earlier automatic translation (which was French to English), the translation performed using the translation box 550 may utilize a different translation service than the one used in process 700. In another implementation an additional "Translate" button is integrated into the translation box 550, which allows the text to be sent to a translation service and translated without the translation being immediately sent to the user's contact.

Figure 9:
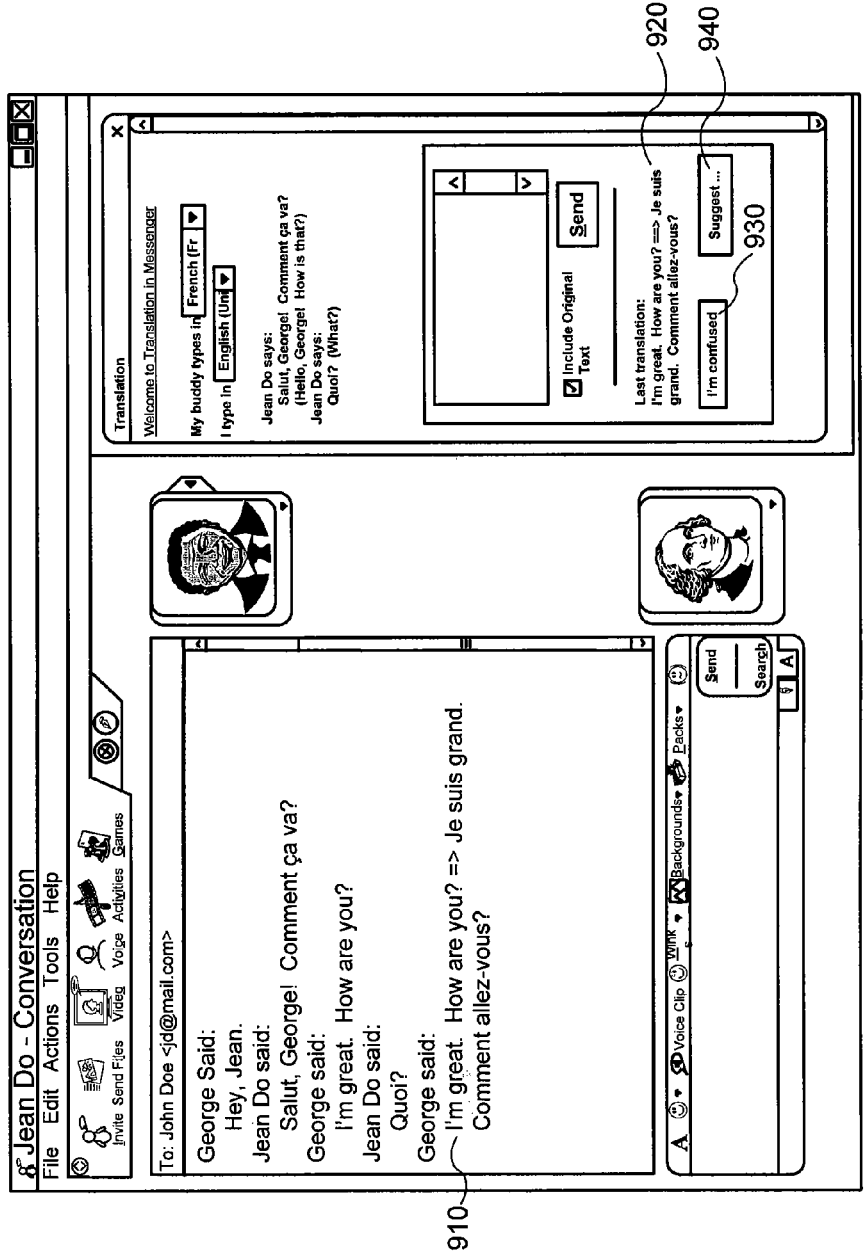
FIG. 9 is a diagram of an exemplary instant messaging window showing the translation box of FIG. 8 being used to manually translate a message.

FIG. 9 shows an example of a message which has been manually translated and sent by use of the translation box 550. In the example, the English-language message "I'm great. How are you?" has been sent to a translation service and translated into the French message "Je suis grand. Comment allez-vous?" and the text of both messages has been sent as a combined message 910 to Jean, George's contact. Additionally, the translation is also displayed as a "last translation" 920 in the translation box 550 of the translation pane 500 so that the user George can view what the last manual translation was.

The ability to review the last translation is of particular use with the present techniques because it cannot always be assumed that the translation will be perfect. This is of further importance because of the flexibility of the techniques described herein to use different (and possibly untested) translation services without knowledge of their internal workings. This is true in the illustrated case, as the translation message 910 implies something to Jean that is more along the lines of "I'm big." than "I'm great."

To deal with possible translation mistakes, the illustrated translation box utilizes various tools to provide additional translation communication between the users. One such tool is the "I'm confused" button 930 of the translation box. This functionality allows the user to send a message to his or her contact pointing out that he did not understand the last message sent and asking for a new message or further explanation. In one implementation, the message may be a pre-set message for each possible language so that it does not require additional translation; in another, a standard universal message may be sent to the translation service to be translated into the contact's language. In yet another, a pre-set code, rather than a text message, may be sent to the user which indicates a lack of understanding. This would be of particular use when two users are both using the translation plug-in, as in this implementation the plug-in could receive the code and indicate the lack of understanding outside of the message window.

Another tool for increasing understanding is the "Suggest" button 940, also displayed in the translation box 550. The "Suggest" box allows a user, when he or she notices that a translation is not as good as he believes it should be, to offer a suggestion for a replacement translation. Thus, the user can click the box, type a new suggested translation, and send that message to his or her contact. In one implementation, this suggestion may also be saved locally to be used in future conversations. In another implementation, the suggestion may be sent to the translation service being currently used, in an effort to improve the service's future performance. In yet another implementation, the "Suggest" functionality may be used in a different instant messaging translation implementation.

Figure 10:
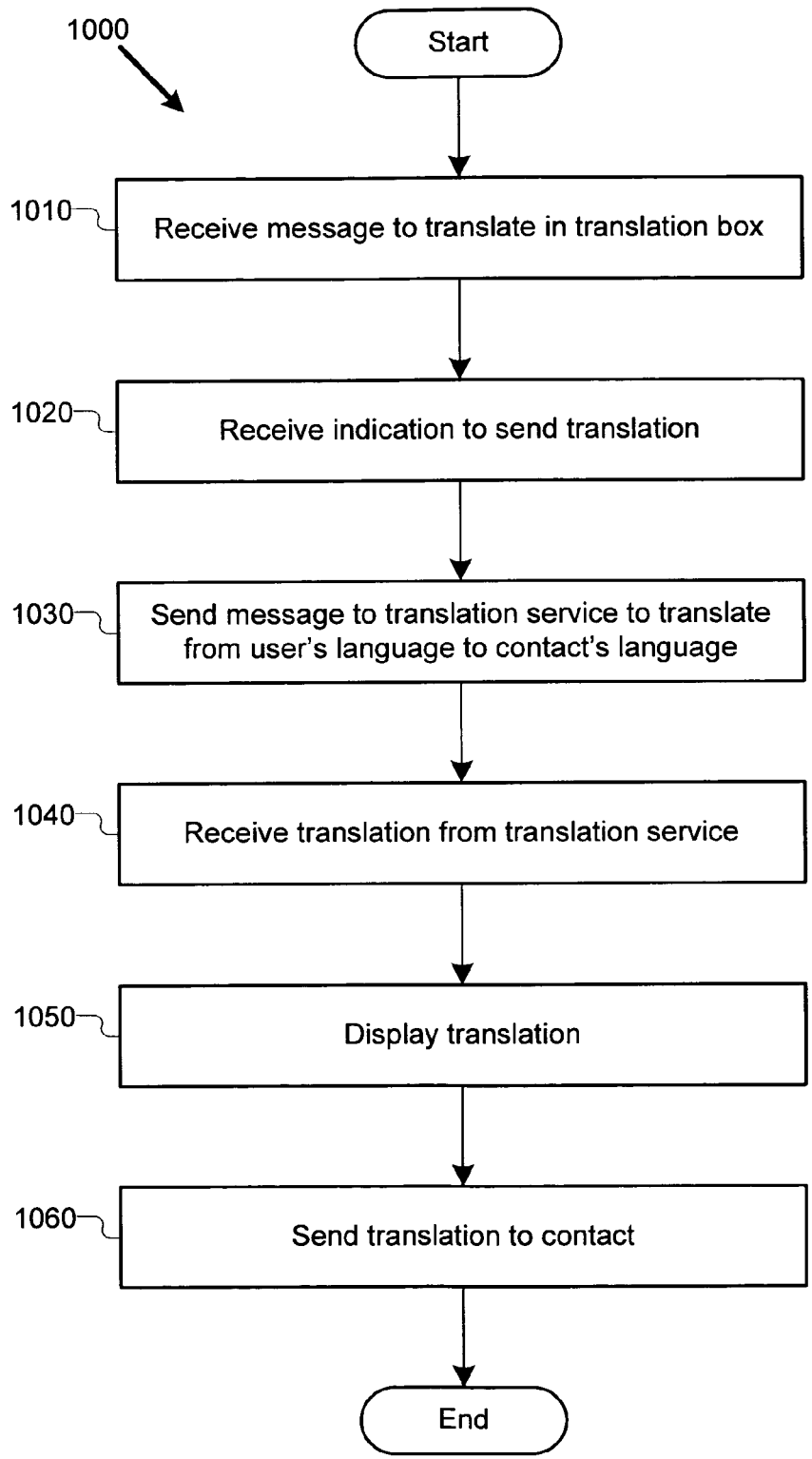
FIG. 10 is a flowchart illustrating an exemplary process of the translation plug-in for translating messages through the translation box.

FIG. 10 illustrates an example process 1000 performed by the translation plug-in 260 for manually translating instant messages through the translation box. In various implementations of process 1000 the illustrated process blocks may be broken up, merged or omitted. The process starts at block 1010, where the message to be translated is received in the translation box. In one implementation, this is done by the user manually typing the message into the box. In another, the translation box may automatically hold either the current message or the last message sent by the user in its input box. Next, at block 1020, the translation receives an indication to send a translation of the input message, usually because the "Send" button 830 has been clicked. As mentioned above, in one implementation, block 1020 may instead involve receiving an indication to translate, but not send, a message, such as if a "Translate" button has been displayed and clicked.

The process then continues to block 1030, where the message is sent to a translation service to translate from the user's language to the language of the user's contact. As discussed above, the translation service to which this message is sent is not necessarily the same as the one used in process 700, as not every service is assumed to be bi-directional. Next, at block 1040, a translation of the message is received from the translation service. The translation is displayed at block 1050 (for example, in the translation box as a "last translation" 920) and then at block 1060 the message is sent to the contact. In one implementation, if the manual translation is performed because a "Translate" rather than a "Send" button has been clicked, the process of block 1060 is not performed and the user can decide whether he or she wished to send the translation.

While the above-described tools provide functionality for a user who needs to directly translate a message, other implementations of the translation plug-in provide a user with the ability to choose to perform translation himself. Thus, if a user received a poor translation, the user may choose to self-translate particular words or phrases in the translation.

In one implementation, self-translation is performed by entering the word or phrase to be translated using the translation box 550. Besides offering a convenient interface for this self-translation, the translation box 550 also, by providing a user a choice of translation services, allows the user an opportunity to correct translation mistakes by selecting a different translation service than the one being used for most incoming messages. In one implementation, the translation plug-in may display the service being used for incoming messages so that the user can select a different service in the case of a bad translation. In another implementation, the translation plug-in allows a user to highlight a word or phrase and select to translate the phrase, through a "Translate" button or a context menu.

In various implementations, the translation techniques and tools described herein are extended to provide translation in the context of a modified instant messaging language which uses abbreviations or substitutions for standard vocabulary. For example, a sentence such as "Are you going out tonight?" may be written "R U going out 2nite?" or the phrase "Be right back" is written as "brb". While a user may be accustomed to messaging using this modified language, most translation services assume standard language as input. Thus, it is useful to, in effect, correct this modified language into a standard language, thereby preparing the message for translation.

In one implementation, corrections are provided a local dictionary is kept of instant messaging language features, including vocabulary and/or letter substitutions. This may be done by allowing a user to enter these language features into the dictionary, or by using a pre-set dictionary. In this implementation, when a message is sent to a contact, the text of the message is compared to the local dictionary, by the translation plug-in or other instant messaging translation tool. If text from the message is found to correspond to language structures in the dictionary, substitutions are made to conform the message to standard language. Then the message can then be forwarded to a translation service.

In an alternative implementation, rather than keep a local instant messaging language dictionary, a translation service may be identified which conforms messages to standard language. Thus, before sending a message to a translation service to translate it into a different language, such a tool would first send the message to the identified service to conform it to standard language, and then to the service which translates it into the foreign language. In any of these implementations, a user may be provided the ability to determine when he or she would like messages to conform to standard language before translation.

Another tool provided by the translation techniques and tools described herein is the handling of misspelled words. Currently, machine translation has not yet reached a stage where misspelled words can be detected before translation. Words for which a service cannot determine a translation, for instance because they are misspelled, are usually just passed through without translation. Because this pass-through is not desirable in instant messaging translation, various implementations of the techniques described herein prepare messages for translation by performing automatic spelling correction at the time a message is sent for translation. In one implementation, not every misspelling is corrected automatically; the tool may correct only commonly-misspelled words or words where one correction is much more likely than others. In yet another implementation, the user may be provided with suggested spellings and allowed to choose one before sending the message to a translation service.

While the spelling-correction tool provides as complete a translation as possible, in some situations, a user may desire that particular words or phrases not be translated. This may be desirable if a user wishes the contact to see a word or phrase in its original language, if the user is using particular jargon or proper names which do not translate, or if the user knows that a word in the user's language is mutually understood and that translating the word is likely to cause confusion. In one implementation, the techniques and tools allow a user to demarcate a word or phrase with particular symbols, such as, for example, quotation marks, which indicates that the word or phrase is not to be translated. In another implementation, a user can select a word or phrase and then use a context menu or button-based tool to indicate that the word or phrase not be translated.

The translation techniques may take use of a number of methods to prevent translation of particular words or phrases. In one implementation, the translation techniques described herein can remove the particular words or phrases from the message before sending the message to a translator service. The words or phrases are then sent to the contact's instant messaging program directly, where they can be recombined with the translated message and presented to the contact. In another implementation, after the words or phrases are removed, the remaining words in the message are sent to be translated and then sent back to the user's instant messaging program, where the message is recombined and then sent to the contact. In yet another implementation, the particular words or phrases are modified in such a way that the translation service will not be able to translate them. In this implementation, because the translation service will most likely pass through words that cannot be translated, these words and phrases will be ignored and can then be modified back to their original form by the contact's instant messaging program. This implementation is desirable from the perspective that it preserves semantics of a word to some extent and that it can be used both in schemes that provide translation on the user's side and on the contact's side.

4. Computing Environment

The above described instant messaging translation techniques can be performed on any of a variety of computing devices and environments, including computers of various form factors (personal, workstation, server, handheld, laptop, tablet, or other mobile), distributed computing networks, and Web services, as a few general examples. The translation techniques can be implemented in hardware circuitry, as well as in software executing within a computer or other computing environment, such as shown in FIG. 11.

Figure 11:
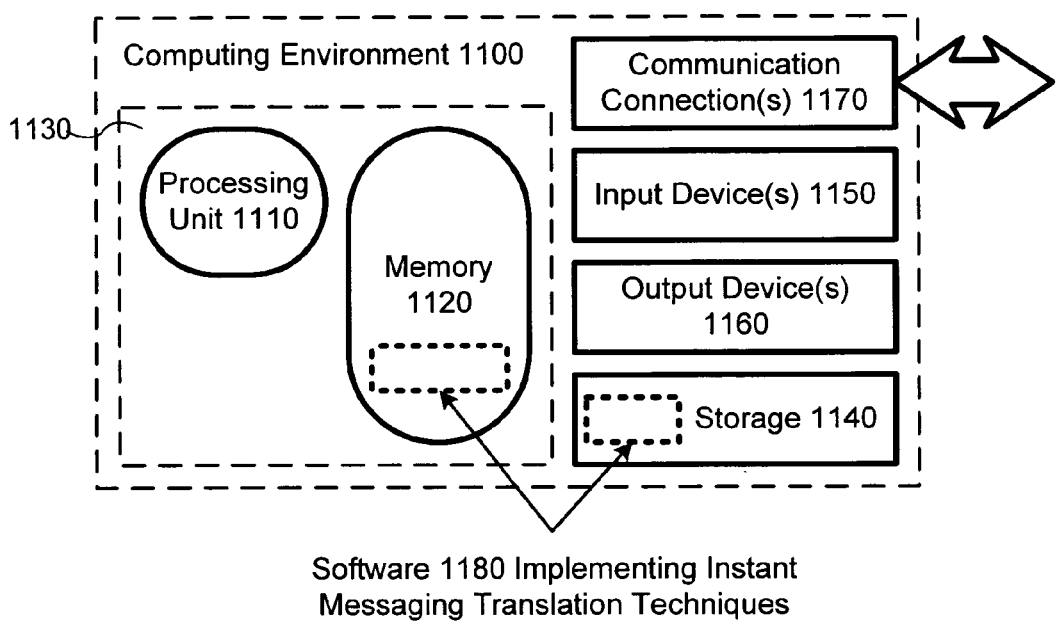
FIG. 11 is a block diagram of an exemplary suitable computing environment for implementing the translation plug-in of FIG. 2.

FIG. 11 illustrates a generalized example of a suitable computing environment (1100) in which described embodiments may be implemented. The computing environment (1100) is not intended to suggest any limitation as to scope of use or functionality of the invention, as the present invention may be implemented in diverse general-purpose or special-purpose computing environments.

With reference to FIG. 11, the computing environment (1100) includes at least one processing unit (1110), and memory (1120). In FIG. 11, this most basic configuration (1130) is included within a dashed line. The processing unit (1110) executes computer-executable instructions and may be a real or a virtual processor. In a multi-processing system, multiple processing units execute computer-executable instructions to increase processing power. The memory (1120) may be volatile memory (e.g., registers, cache, RAM), non-volatile memory (e.g., ROM, EEPROM, flash memory, etc.), or some combination of the two. The memory (1120) stores software (1180) implementing the described translation techniques. The GPU (1115) may be integrated with the processing unit 1110 on a single board or may be contained separately.

A computing environment may have additional features. For example, the computing environment (1100) includes storage (1140), one or more input devices (1150), one or more output devices (1160), and one or more communication connections (1170). An interconnection mechanism (not shown) such as a bus, controller, or network interconnects the components of the computing environment (1100). Typically, operating system software (not shown) provides an operating environment for other software executing in the computing environment (1100), and coordinates activities of the components of the computing environment (1100).

The storage (1140) may be removable or non-removable, and includes magnetic disks, magnetic tapes or cassettes, CD-ROMs, CD-RWs, DVDs, or any other medium which can be used to store information and which can be accessed within the computing environment (1100). The storage (1140) stores instructions for the software (1180) implementing the described translation techniques.

The input device(s) (1150) may be a touch input device such as a keyboard, mouse, pen, or trackball, a voice input device, a scanning device, or another device that provides input to the computing environment (1100). For audio, the input device(s) (1150) may be a sound card or similar device that accepts audio input in analog or digital form, or a CD-ROM reader that provides audio samples to the computing environment. The output device(s) (1160) may be a display, printer, speaker, CD-writer, or another device that provides output from the computing environment (1100).

The communication connection(s) (1070) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The translation techniques herein can be described in the general context of computer-readable media. Computer-readable media are any available media that can be accessed within a computing environment. By way of example, and not limitation, with the computing environment (1100), computer-readable media include memory (1120), storage (1140), communication media, and combinations of any of the above.

The translation techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "interpolate," and "compute" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A computer-implemented method comprising:
   under control of an instant messaging program:
   displaying, on a client device, a list of languages to translate between;
   receiving a user selection from the list of languages related to a desired translation;
   displaying a list of third-party translation services on the client device that can perform the translation selected from the list of languages, wherein the list is received from a server computer and added to by the user;
   receiving a user selection of which third-party translation service to use;
   displaying a messaging pane and a translation pane on the client device;
   receiving an incoming message on the client device from a network;

automatically sending the incoming message to the selected third-party translation service located on a server computer coupled to the network;

receiving a translation from the third-party translation service on the client device;

simultaneously displaying the incoming message in the messaging pane and the incoming message and a translation of the incoming message in the translation pane;

receiving an indication from a recipient user that the recipient user does not understand the translation of the incoming message; and based upon the indication, sending an error message to a sending user of the incoming message indicating that the translation of the incoming message was not understood;

wherein the recipient user is not required to be able to communicate in a language used by the sending user to indicate that the recipient user did not understand the translation of the incoming message.

2. The method of claim 1, wherein:
the method is performed by a translation plug-in to the instant messaging program.

3. The method of claim 2, further comprising:
in the instant messaging program:
receiving an indication from a user to begin translation services;
requesting translation plug-in code from a computer; and
executing received translation plug-in code to display the translation pane.

4. The method of claim 1, further comprising:
in the instant messaging program, requesting a list of translation services from a computer;
receiving the list of translation services; and
providing translation options to a user based on the translation capabilities of services listed in the list of translation services.

5. The method of claim 1, further comprising:
displaying a translation box in the translation pane;
receiving, in the translation box, text from a user to be translated;
receiving, in the translation box, an indication that the text should be translated; and
displaying translated text in the translation box.

6. The method of claim 5, further comprising:
receiving, in the translation box, an indication that the translated text should be sent as an instant message; and
sending the translated text as an instant message.

7. The method of claim 5, further comprising:
receiving an indication that the translated text was improperly translated;
receiving an alternative translation from the user; and
sending the alternative translation as an instant message.

8. The method of claim 5, further comprising:
automatically correcting misspelled words in the text before translation.

9. The method of claim 5, further comprising:
if the text contains instant messaging language, automatically correcting the text into standard language form before translation.

10. The method of claim 1, further comprising:
based upon the indication, sending a message to the translation service such that the translation service can log that the translation was not understood by the recipient user.

11. The method of claim 1, wherein the method is performed on a mobile device.

12. A computer-based system comprising:
a translation module on a client device; and
an instant messaging module configured to receive a message and display the message in a messaging window;
wherein the translation module is configured to:
receive an indication that the received message is to be translated;
modify the received message according to user preferences to facilitate translation; and
translate the modified received message by sending the received message to a third-party translation service and receiving back a translated message from the third-party translation service, wherein the third-party translation service is selectable on the client device from a list of third-party translation services provided, in part, from a server and, in part, from a user; and
displaying the translated message in the messaging window; and further configured to:
receive an indication from a recipient user that the recipient user does not understand the translation of the incoming message; and
based upon the indication, send an error message to a sending user of the incoming message indicating that the translation of the incoming message was not understood
wherein the recipient user is not required to be able to communicate in a language used by the sending user to indicate that the recipient user did not understand the translation of the incoming message.

13. The system of claim 12, wherein the translation module is further configured to display a translation box comprising a text entry field and a translate button, and configured to:
allow a user to enter text in the translation box; and
upon the user hitting the translate button:
send the text to the translation service; and
display a translation of the entered text.

14. The system of claim 12, wherein the translation module is configured to:
automatically correct spelling of the received message before translation;
utilize a dictionary to correct instant messaging language into a standard language; and
after receiving indications that particular words are not to be translated, prevent those words from being translated by the translation service.

15. A method of translating instant messages on a client device, comprising:
displaying a translation pane on a client device;
receiving information regarding a first language used on the client device and a second language used on a remote device, which is communicating with the client device through a network;
receiving information on the client device regarding which third-party translation service to use to translate between the first and second languages, the information relating to selection of one of a list of third-party translation services provided by a server computer and further supplemented by a user of the client device;
receiving an incoming text message on the client device from the network in the second language;
after receipt of the incoming text message, sending the incoming text message from the client device to a third-party translation service located on a server computer coupled to the network;

receiving, on the client device, a translated text message in the first language from the third-party translation service; and displaying the translated text message in the first language;

receiving an indication from a recipient user that the recipient user does not understand the translation of the incoming message; and based upon the indication, sending an error message to a sending user of the incoming message indicating that the translation of the incoming message was not understood;

wherein the recipient user is not required to be able to communicate in a language used by the sending user to indicate that the recipient user did not understand the translation of the incoming message.

16. The method of claim 15, wherein client device has stored thereon a list of two or more third-party translation services, and wherein the list is received on the client device from a server computer.

17. The method of claim 15, wherein a plug-in on the client device communicates with the third-party translation service, the plug-in being downloaded from a server computer.

* * * * *